(12) United States Patent
Nomura (10) Patent No.: US 10,967,999 B2
(45) Date of Patent: Apr. 6, 2021

(54) HORIZONTAL PILLOW PACKING APPARATUS AND HORIZONTAL PILLOW PACKING METHOD

(71) Applicant: NISSHIN SEIFUN GROUP INC., Tokyo (JP)

(72) Inventor: Mitsuo Nomura, Fujimino (JP)

(73) Assignee: NISSHIN SEIFUN GROUP INC., Tokyo (JP)

( * ) Notice: Subject to any disclaimer, the term of this patent is extended or adjusted under 35 U.S.C. 154(b) by 142 days.

(21) Appl. No.: 15/529,956

(22) PCT Filed: Nov. 12, 2015

(86) PCT No.: PCT/JP2015/081836
§ 371 (c)(1),
(2) Date: May 25, 2017

(87) PCT Pub. No.: WO2016/088527
PCT Pub. Date: Jun. 9, 2016

(65) Prior Publication Data
US 2017/0327258 A1    Nov. 16, 2017

(30) Foreign Application Priority Data
Dec. 2, 2014 (JP) .............................. JP2014-243683

(51) Int. Cl.
*B65B 51/28* (2006.01)
*B65B 9/08* (2012.01)
*B65B 51/10* (2006.01)

(52) U.S. Cl.
CPC ............... *B65B 51/28* (2013.01); *B65B 9/08* (2013.01); *B65B 51/10* (2013.01)

(58) Field of Classification Search
CPC ........... B65B 51/28; B65B 9/08; B65B 51/10; B65B 51/26; B65B 51/32
(Continued)

(56) References Cited

U.S. PATENT DOCUMENTS 4,288,967 A * 9/1981 Seko ....................... B29C 65/18
156/583.1
4,726,169 A * 2/1988 Achelpohl .............. B31B 70/00
493/198
(Continued)

FOREIGN PATENT DOCUMENTS

JP        S58-14302 U    1/1983
JP        H07-237796 A   9/1995
(Continued)

OTHER PUBLICATIONS

Jul. 10, 2018 Chinese Office Action issued in Chinese Patent Application No. CN 201580064080.X.
(Continued)

*Primary Examiner* — Chelsea E Stinson
*Assistant Examiner* — Mary C Hibbert-Copeland
(74) *Attorney, Agent, or Firm* — Oliff PLC (57) ABSTRACT

A horizontal pillow packing apparatus includes a center sealer configured to wrap a packing target object by bringing both end portions of a back surface of a belt-shaped film in a width direction into contact with each other and seal a center seal portion at which the both end portions of the back surface in the width direction are in contact with each other, and an end sealer configured to seal and cut both side portions of the belt-shaped film wrapping the packing target object in the width direction. The center sealer includes at least two pairs of heating rollers configured to nip and heat the center seal portion of the belt-shaped film wrapping the packing target object, and a pair of compression rollers configured to cool and compress, to bond the center seal portion, the center seal portion heated by the at least two pairs of heating rollers.

8 Claims, 6 Drawing Sheets

(58) Field of Classification Search
USPC .............. 53/450, 399, 550, 551, 455, 412
See application file for complete search history.

(56) References Cited

U.S. PATENT DOCUMENTS

| | | | | |
|---|---|---|---|---|
| 5,341,623 | A | * | 8/1994 | Siegel ............... B29C 66/81435 53/433 |
| 5,548,947 | A | * | 8/1996 | Fincham ............... B26D 1/245 53/374.4 |
| 2003/0050166 | A1 | * | 3/2003 | Dominguez, Jr. ......... B65B 9/20 493/296 |
| 2007/0240591 | A1 | * | 10/2007 | Hampl .................. B41F 33/14 101/216 |

FOREIGN PATENT DOCUMENTS

| | | | | |
|---|---|---|---|---|
| JP | H08-182472 | A | | 7/1996 |
| JP | H10-35621 | A | | 2/1998 |
| JP | H11-262962 | A | | 9/1999 |
| JP | 2003-212222 | A | | 7/2003 |
| JP | 2005-153985 | A | | 6/2005 |
| JP | 2005153985 | A | * | 6/2005 ....... B29C 66/87443 |
| JP | 2006-298384 | A | | 11/2006 |
| JP | 2008-296988 | A | | 12/2008 |
| JP | 2009-143600 | A | | 7/2009 |
| JP | 2011-1069 | A | | 1/2011 |

OTHER PUBLICATIONS

Aug. 3, 2018 Taiwanese Office Action issued in Taiwanese Patent Application No. TW 104138658.
Dec. 25, 2018 Office Action issued in Japanese Patent Application No. 2016-562366.
Jan. 26, 2016 International Search Report issued in International Patent Application No. PCT/JP2015/081836.
Jun. 6, 2018 Extended European Search Report issued in Patent Application No. 15864914.5.
Jun. 6, 2017 International Preliminary Report on Patentability issued in Patent Application No. PCT/JP2015/081836.
Jul. 2, 2019 Office Action issued in Japanese Patent Application No. 2016-562366.
Apr. 16, 2019 Office Action issued in European Patent Application No. 15864914.5.
Feb. 28, 2019 Office Action issued in Chinese Patent Application No. 201580064080.X.
Aug. 22, 2019 Office Action issued in Chinese Patent Application No. 201580064080.X.
"Flexible Packaging Production Technology," Printing Industry Press, pp. 116-117, Jul. 30, 2012.
Qiutao, Wu., "Questions and Answers for Flexible Packaging Practical Technology," Printing Industry Press, p. 287, Nov. 30, 2008.
Mar. 10, 2020 Office Action issued in Japanese Patent Application No. 2016-562366.
Sep. 29, 2020 Office Action issued in Japanese Patent Application No. 2019-176346.
Nov. 10, 2020 Trial and Appeal Decision issued in Japanese Patent Application No. 2016-562366.
Feb. 8, 2021 Office Action issued in Canadian Patent Application No. 2,969,204.

* cited by examiner

HORIZONTAL PILLOW PACKING APPARATUS AND HORIZONTAL PILLOW PACKING METHOD

TECHNICAL FIELD

The present invention relates to a horizontal pillow packing apparatus, particularly to a horizontal pillow packing apparatus for packing frozen food and a horizontal pillow packing method using the horizontal pillow packing apparatus.

BACKGROUND ART

A horizontal pillow packing apparatus configured to pack a packing target object includes a center sealer and an end sealer. The center sealer disposed on the upstream side brings both end portions of a back surface of a continuously-supplied belt-shaped film in a width direction into contact with each other to wrap packing target objects sequentially supplied with predetermined intervals, and seals a center seal portion at which the both end portions of the back surface of the belt-shaped film in the width direction are in contact with each other. The end sealer disposed on the downstream side seals and cuts, in the width direction, end seal portions of the belt-shaped film, which is conveyed from the center sealer and wrapping a packing target object, provided on both sides of the packing target object (for example, see Patent Literature 1).

As described in Patent Literature 1, the center sealer includes a pair of conveyance rollers and a pair of heating rollers. The pair of conveyance rollers disposed on the upstream side nips the center seal portion at which the both end portions of the back surface of the belt-shaped film wrapping the packing target object in the width direction and conveys the belt-shaped film. The pair of heating rollers disposed on the downstream side nips and heats the center seal portion of the belt-shaped film conveyed thereto. The center seal portion of the belt-shaped film is bonded via thermocompression bonding by being heated and pressurized by the pair of heating rollers.

CITATION LIST

Patent Literature

Patent Literature 1: JP 2003-212222 A

SUMMARY OF INVENTION

Technical Problem

However, since the time in which the center seal portion is heated and pressurized by the pair of heating rollers is radically shorter than the heating-pressurizing time of the end sealer that seals the end seal portion by using, for example, a box motion mechanism, there is a problem that the seal strength of center sealing is lower than the seal strength of end sealing. In addition, there is a problem that, although increase in the operation speed of the horizontal pillow packing apparatus is desired, when the operation speed of the horizontal pillow packing apparatus is increased, the rotation speed of the pair of heating rollers is also increased along with the increase, and thus the heating-pressurizing time is further shortened.

Further, in the case where the heating temperature of the pair of heating rollers is set to a high value in order to increase the seal strength of center sealing, the surface of the film is slightly melted by the heating and the melted film attaches to the surface of the heating rollers. When the attachment is accumulated, the heating becomes irregular due to the attached contamination, and thus it is required to regularly wash the heating rollers.

An object of the present invention is to provide a horizontal pillow packing apparatus capable of retaining a high seal strength of center sealing even in the case of being operated at a high speed and a horizontal pillow packing method using the horizontal pillow packing apparatus.

Solution to Problem

A horizontal pillow packing apparatus according to the present invention includes a center sealer configured to wrap a packing target object by bringing both end portions of a back surface of a belt-shaped film in a width direction into contact with each other and seal a center seal portion at which the both end portions of the back surface in the width direction are in contact with each other; and an end sealer configured to seal and cut both side portions of the belt-shaped film wrapping the packing target object in the width direction. The center sealer includes at least two pairs of heating rollers configured to nip and heat the center seal portion of the belt-shaped film wrapping the packing target object, and a pair of compression rollers configured to cool and compress, to bond the center seal portion, the center seal portion heated by the at least two pairs of heating rollers.

In addition, a horizontal pillow packing apparatus according to the present invention includes a preheating portion configured to preheat the center seal portion before the center seal portion is heated by the at least two pairs of heating rollers.

In addition, in a horizontal pillow packing apparatus according to the present invention, the packing target object is frozen food.

In addition, a horizontal pillow method according to the present invention is a horizontal pillow packing method for packing a packing target object via horizontal pillow packing by using a horizontal pillow packing apparatus. The horizontal pillow packing apparatus includes a center sealer configured to wrap the packing target object by bringing both end portions of a back surface of a belt-shaped film in a width direction into contact with each other and seal a center seal portion at which the both end portions of the back surface in the width direction are in contact with each other and an end sealer configured to seal and cut both side portions of the belt-shaped film wrapping the packing target object in the width direction. The horizontal pillow packing method includes a step of nipping and heating, by using at least two pairs of heating rollers of the center sealer, the center seal portion of the belt-shaped film wrapping the packing target object, and a step of cooling and compressing, to bond the center seal portion, by using a pair of compression rollers of the center sealer, the center seal portion heated by the at least two pairs of heating rollers.

In addition, a horizontal pillow packing method according to the present invention includes a step of preheating the center seal portion before the center seal portion is heated by the at least two pairs of heating rollers.

In addition, in a horizontal pillow packing method according to the present invention, the packing target object is frozen food.

Advantageous Effects of Invention

According to the present invention, a horizontal pillow packing apparatus capable of retaining a high seal strength of center sealing even in the case of being operated at a high speed and a horizontal pillow packing method using the horizontal pillow packing apparatus can be provided.

DESCRIPTION OF EMBODIMENTS

A horizontal pillow packing apparatus according to an exemplary embodiment of the present invention will be described below with reference to drawings. The horizontal pillow packing apparatus according to the exemplary embodiment includes a supplying portion (not illustrated) that continuously supplies a belt-shaped film and sequentially supplies frozen foods serving as packing target objects with predetermined intervals, a center sealer, and an end sealer (not illustrated).

Figure 1:
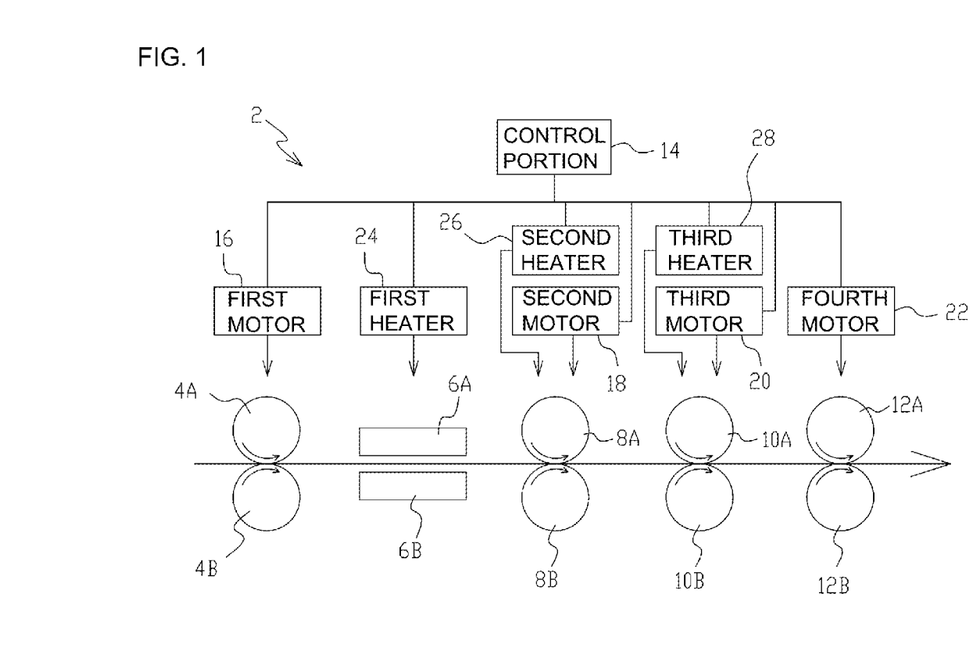
FIG. 1 is a diagram illustrating a schematic configuration of a center sealer according to an exemplary embodiment.

FIG. 1 is a diagram illustrating an outline of the center sealer included in the horizontal pillow packing apparatus according to the exemplary embodiment. As illustrated in FIG. 1, a center sealer 2 includes a pair of conveyance rollers 4A and 4B, a pair of preheating bars 6A and 6B, a pair of first heating rollers 8A and 8B, a pair of second heating rollers 10A and 10B, a pair of compression rollers 12A and 12B, a control portion 14, a first motor 16, a second motor 18, a third motor 20, a fourth motor 22, a first heater 24, a second heater 26, and a third heater 28.

The pair of conveyance rollers 4A and 4B is disposed downstream of the supplying portion that is not illustrated and upstream of the pair of preheating bars 6A and 6B, and is configured to be respectively rotatable in directions indicated by arrows in the figure. The belt-shaped film and frozen food supplied by the supplying portion that is not illustrated is conveyed to the pair of conveyance rollers 4A and 4B in a state in which both end portions of a back surface of the belt-shaped film in a width direction are in contact with each other and the frozen food is thereby wrapped. The pair of conveyance rollers 4A and 4B nips a center seal portion at which the both end portions of the back surface of the belt-shaped film in the width direction are in contact with each other and rotates to convey the belt-shaped film downstream.

The pair of preheating bars 6A and 6B are disposed downstream of the pair of conveyance rollers 4A and 4B and upstream of the pair of first heating rollers 8A and 8B. A minute gap is provided between the preheating bars 6A and 6B, and the center seal portion of the belt-shaped film conveyed by the pair of conveyance rollers 4A and 4B passes through the gap between the preheating bars 6A and 6B. The pair of preheating bars 6A and 6B are heated by the first heater 24 that will be described later, and preheats the center seal portion before the center seal portion is heated by the pair of first heating rollers 8A and 8B and the pair of second heating rollers 10A and 10B.

The pair of first heating rollers 8A and 8B are disposed downstream of the pair of preheating bars 6A and 6B and upstream of the pair of second heating rollers 10A and 10B, and is configured to be respectively rotatable in directions indicated by arrows in the figure. The pair of first heating rollers 8A and 8B are heated by the second heater 26 that will be described later, and nips and heats the center seal portion of the belt-shaped film preheated by the pair of preheating bars 6A and 6B. In addition, the pair of first heating rollers 8A and 8B rotates to convey the belt-shaped film downstream.

The pair of second heating rollers 10A and 10B are disposed downstream of the pair of first heating rollers 8A and 8B and upstream of the pair of compression rollers 12A and 12B, and is configured to be respectively rotatable in directions indicated by arrows in the figure. The pair of second heating rollers 10A and 10B are heated by the third heater 28 that will be described later, and nips and further heats the center seal portion of the belt-shaped film heated by the pair of first heating rollers 8A and 8B. In addition, the pair of second heating rollers 10A and 10B rotates to convey the belt-shaped film downstream.

The pair of compression rollers 12A and 12B are disposed downstream of the pair of second heating rollers 10A and 10B and upstream of the end sealer that is not illustrated, and is configured to be respectively rotatable in directions indicated by arrows in the figure. The pair of compression rollers 12A and 12B is not connected to a heater and is thus not heated, and cools and compresses the center seal portion of the belt-shaped film heated by the pair of second heating rollers 10A and 10B to bond the center seal portion. In addition, the pair of compression rollers 12A and 12B rotates to convey the belt-shaped film downstream.

The control portion 14 integrally controls each component of the center sealer 2. The control portion 14 is connected to the first motor 16, the second motor 18, the third motor 20, the fourth motor 22, the first heater 24, the second heater 26, and the third heater 28. The first motor 16 rotates the pair of conveyance rollers 4A and 4B in the directions indicated by arrows in the figure in accordance with control by the control portion 14. The control portion 14 controls the rotation speed of the pair of conveyance rollers 4A and 4B by controlling the drive of the first motor 16. Similarly, the second motor 18, the third motor 20, and the fourth motor 22 respectively rotate the pair of first heating rollers 8A and 8B, the pair of second heating rollers 10A and 10B, and the pair of compression rollers 12A and 12B in the directions indicated by arrows in the figure in accordance with control by the control portion 14. The control portion 14 controls respective rotation speeds of the pair of first heating rollers 8A and 8B, the pair of second heating rollers 10A and 10B, and the pair of compression rollers 12A and 12B by respectively controlling the drive of the second motor 18, the third motor 20, and the fourth motor 22.

The first heater 24 heats the pair of preheating bars 6A and 6B in accordance with control by the control portion 14. The control portion 14 controls the temperature of the pair of preheating bars 6A and 6B by controlling the heating by the first heater 24. Similarly, the second heater 26 and the third heater 28 respectively heat the pair of first heating rollers 8A and 8B and the pair of second heating rollers 10A and 10B in accordance with control by the control portion 14. The control portion 14 controls respective temperatures of the pair of first heating rollers 8A and 8B and the pair of second heating rollers 10A and 10B by controlling the heating respectively performed by the second heater 26 and the third heater 28.

In the case of performing horizontal pillow packing of frozen foods via horizontal pillow packing by using the belt-shaped film and the horizontal pillow packing apparatus according to this exemplary embodiment, the frozen foods sequentially supplied by the supplying portion with the predetermined intervals are wrapped by the belt-shaped film by bringing the both end portions of the back surface of the belt-shaped film continuously supplied by the supplying portion in the width direction into contact with each other. The belt-shaped film wrapping frozen food is conveyed from the supplying portion to the center sealer 2. The control portion 14 has started rotating the pair of conveyance rollers 4A and 4B at a predetermined rotation speed by the first motor 16 in advance, and the pair of conveyance rollers 4A and 4B nips the center seal portion at which the both end portions of the back surface of the belt-shaped film in the width direction conveyed thereto from the supplying portion are in contact with each other and rotates to convey the belt-shaped film downstream. The control portion 14 has heated the pair of preheating bars 6A and 6B to a predetermined temperature by using the first heater 24 in advance, and the pair of preheating bars 6A and 6B preheats the center seal portion of the belt-shaped film conveyed thereto from the pair of conveyance rollers 4A and 4B.

The control portion 14 has started rotating the pair of first heating rollers 8A and 8B at a predetermined rotation speed by the second motor 18 in advance, and has heated the first heating rollers 8A and 8B to a predetermined temperature by using the second heater 26. The pair of first heating rollers 8A and 8B nips and heats the center seal portion of the belt-shaped film preheated by the pair of preheating bars 6A and 6B, and rotates to convey the belt-shaped film downstream.

The control portion 14 has started rotating the pair of second heating rollers 10A and 10B at a predetermined rotation speed by the third motor 20 in advance, and has heated the second heating rollers 10A and 10B to a predetermined temperature by using the third heater 28. The pair of second heating rollers 10A and 10B nips and further heats the center seal portion of the belt-shaped film heated by the pair of first heating rollers 8A and 8B, and rotates to convey the belt-shaped film downstream.

The control portion 14 has started rotating the pair of compression rollers 12A and 12B at a predetermined rotation speed by the fourth motor 22 in advance. The pair of compression rollers 12A and 12B compresses and cools the center seal portion of the belt-shaped film heated by the pair of first heating rollers 8A and 8B and the pair of second heating rollers 10A and 10B to bond the center seal portion, and rotates to convey the belt-shaped film downstream, that is, to the end sealer (not illustrated). After the center seal portion of the belt-shaped film wrapping the frozen food is sealed by the center sealer 2, the belt shaped film is conveyed to the end sealer. The end sealer seals and cuts, in the width direction, portions of the belt-shaped film wrapping the frozen food on both sides of the frozen food. According to this, the frozen food is packed in the belt-shaped film via horizontal pillow packing.

According to the horizontal pillow packing apparatus according to this exemplary embodiment, since two pairs of heating rollers (the pair of first heating rollers 8A and 8B and the pair of second heating rollers 10A and 10B) are provided, the heating-pressurizing time of the heating rollers on the center seal portion can be elongated, and the seal strength of center sealing can be retained at a high level in the case of being operated at a high speed. In addition, since the heating-pressurizing time can be elongated, it is not required to set the temperature of the heating rollers to a high value, and thus the belt-shaped film can be prevented from melting and attaching to the heating rollers.

Here, the belt-shaped film is constituted by plural layers famed of plural resin films stuck together. PET (Polyethylene terephthalate), nylon, OPP (oriented polypropylene), and so forth are generally used as a base film on the front side, and PP (not oriented polypropylene), LLDPE (lateral low-density polyethylene), LDPE (low-density polyethylene), and so forth are generally used as a sealant film on the back side. Generally, when a substance having a lower melting point than the melting point of a base film is used as a sealant film and the temperature is set to a predetermined value, the sealant film melts to function as an adhesive while the base film does not melt, and the both end portions of the back surface in the width direction and both side portions in a cylinder axis direction of the belt shaped film are sealed by the sealant film.

Figure 2:
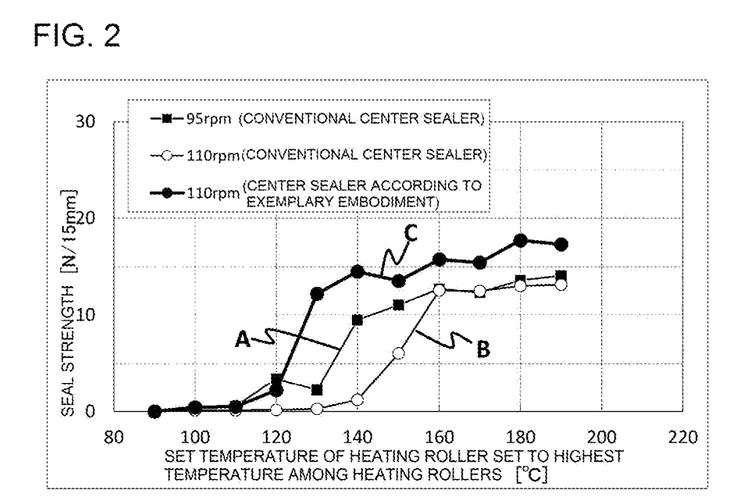
FIG. 2 is a graph illustrating seal strengths of center sealing with respect to set temperatures of a heating roller.
Figure 3:
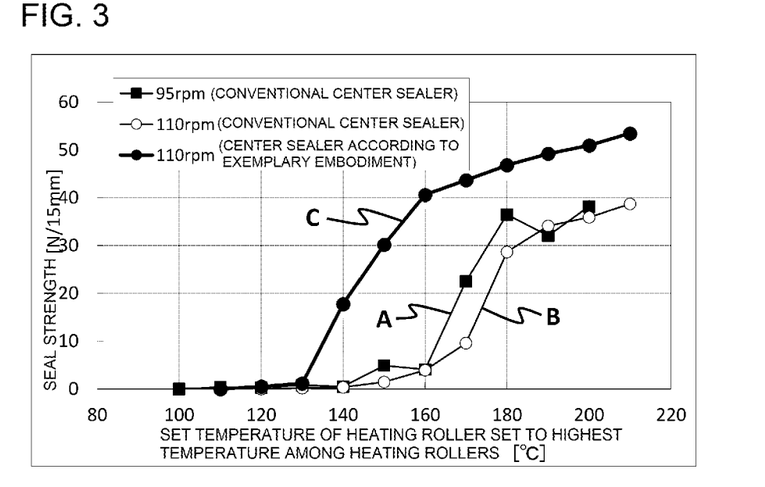
FIG. 3 is a graph illustrating seal strengths of center sealing with respect to set temperatures of a heating roller.

FIG. 2 is a graph illustrating seal strengths (N/15 mm) of center sealing of a 15 mm-wide sample with respect to set temperatures (° C.) of a heating roller in the case where a belt-shaped film famed by sticking together 20 μm-thick OPP serving as a base film and 30 μm-thick LLDPE serving as a sealant film. FIG. 3 is a graph illustrating seal strengths (N/15 mm) of center sealing with respect to set temperatures (° C.) of a heating roller in the case where a belt-shaped film formed by sequentially sticking together 20 μm-thick OPP and 12 μm-thick PET serving as a base film and 30 μm-thick LLDPE serving as a sealant film. To be noted, the seal strengths in the present application are measured via a method defined in JIS Z 0238.

Figure 6:
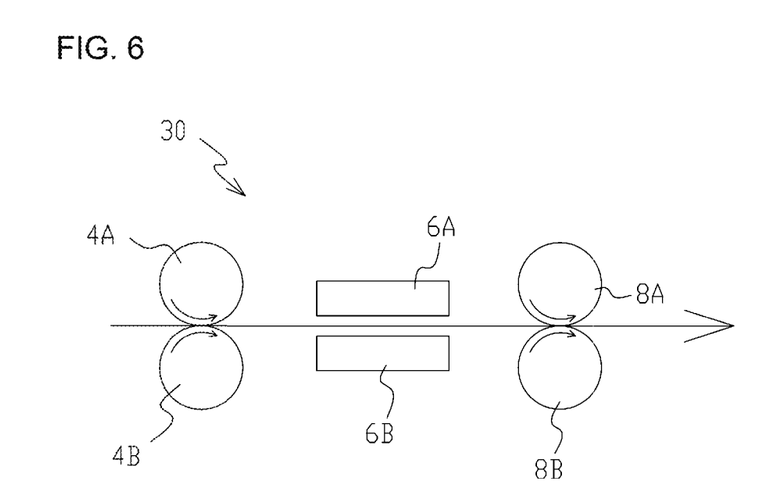
FIG. 6 is a diagram illustrating a schematic configuration of a conventional center sealer.

Graphs A of FIG. 2 and FIG. 3 illustrate seal strengths with respect to set temperatures in the case where a conventional center sealer 30 not including a compression roller and including only the pair of heating rollers 8A and 8B as illustrated in FIG. 6 is caused to operate in 95 rpm (approximately 95 units/min), graphs B illustrate seal strengths with respect to set temperatures in the case where the conventional center sealer 30 is caused to operate in 110 rpm (approximately 110 units/min), and graphs C illustrate seal strengths with respect to set temperatures in the case where the center sealer 2 according to this exemplary embodiment as illustrated in FIG. 1 is caused to operate in 110 rpm (approximately 110 units/min). To be noted, in the center sealer 2, the first heating rollers 8A and 8B and the second heating rollers 10A and 10B are both set to a set temperature. To be noted, 95 rpm (approximately 95 units/min) in the present application refers to an operation speed of the horizontal pillow packing apparatus when the number of units at a time point in which the belt-shaped film is cut off after being subjected to center sealing and end sealing is approximately 95 per minute.

In the case where the conventional center sealer 30 is used and it is aimed to achieve a seal strength of, for example, 15 N/15 mm or greater, it cannot be achieved no matter how much heat is applied as illustrated by graphs A and B in FIG. 2, or it is required to raise the set temperature of the heating rollers to a higher value than 165° C. as illustrated by graphs A and B in FIG. 3. In an actual manufacturing process, the heating rollers are used in a state of being heated to approximately 200° C., and, in the case where the belt-shaped film is heated by the heating rollers set to a higher temperature (approximately 200° C.) than the melting point (165° C.) of OPP constituting the base film, the OPP slightly melts and attaches to the surface of the heating rollers. Then, the attachment to the surface of the heating rollers accumulates, and the accumulated attachment causes heating irregularity. Since the sealing precision is degraded when heating irregularity occurs, it is required to regularly clean the surface of the heating rollers.

In contrast, in the case where the center sealer 2 according to this exemplary embodiment is used, the set temperature of the heating rollers (first heating rollers 8A and 8B and second heating rollers 10A and 10B) can be set to a lower value than 165° C. when it is aimed to achieve a seal strength of, for example, 15 N/15 mm or greater as illustrated in graphs C in FIGS. 2 and 3. That is, a high seal strength can be retained even in the case where the set temperature of the heating rollers is lower than 165° C., which is the melting point of OPP constituting the base film. Accordingly, the set temperature of the heating rollers can be lowered, the base film famed of OPP or the like can be prevented from melting, and thus the occurrence of heating irregularity caused by attached matter and the frequency of cleaning of the heating rollers can be reduced.

In addition, according to the horizontal pillow packing apparatus according to this exemplary embodiment, since the pair of compression rollers 12A and 12B are provided, the center seal portion of the belt-shaped film heated by the pair of first heating rollers 8A and 8B and the pair of second heating rollers 10A and 10B can be cooled quickly.

Figure 4:
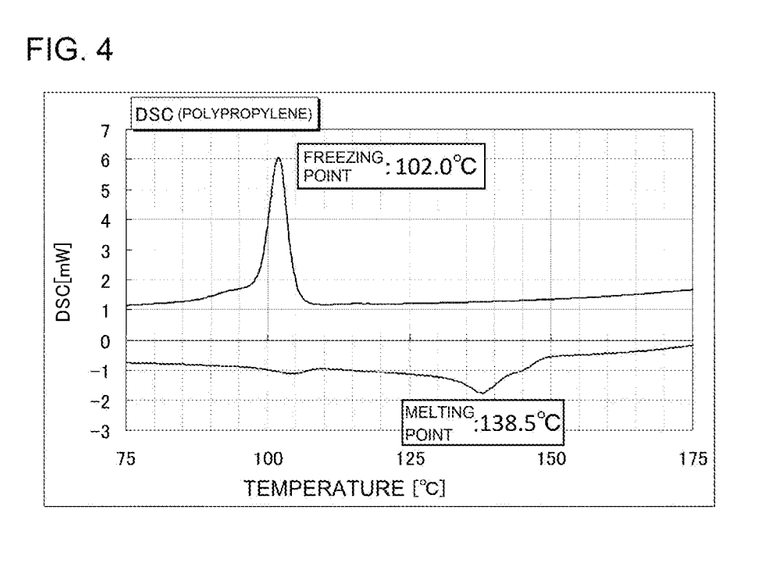
FIG. 4 is a graph illustrating a result of differential scanning calorimetry measurement of a melting point and a freezing point of polypropylene.
Figure 5:
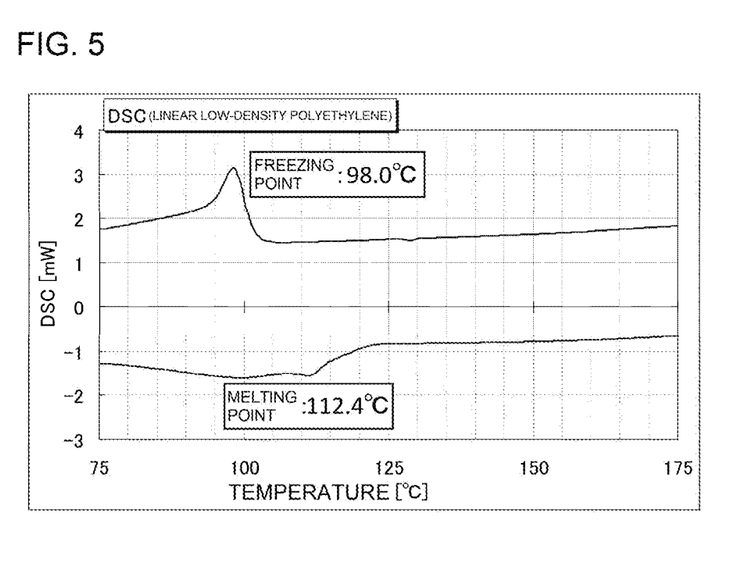
FIG. 5 is a graph illustrating a result of differential scanning calorimetry measurement of a melting point and a freezing point of a linear low-density polyethylene.

FIG. 4 is a graph illustrating a result of differential scanning calorimetry measurement (DSC (mW)) of a melting point (° C.) and a freezing point (° C.) of PP (polypropylene), and FIG. 5 is a graph illustrating a result of differential scanning calorimetry measurement (DSC (mW)) of a melting point (° C.) and a freezing point (° C.) of LLDPE (linear low-density polyethylene). To be noted, the differential scanning calorimetry measurement is performed by using a differential scanning calorimeter (DSC) Thermo Plus EVO DSC8230 manufactured by Rigaku Corporation. As illustrated in FIGS. 4 and 5, PP, which is generally used as a sealant film for a package material that packages frozen food, has a large difference between the melting point and the freezing point compared with LLDPE, which is also generally used as a sealant film. Accordingly, in the case where PP is used as the sealant film, the belt-shaped film is heated at a temperature higher than the melting point of PP, and it takes time to cool the PP to the freezing point after performing center sealing. In the case where the time for cooling down to the freezing point is longer, a temperature equal to or higher than the freezing point is retained for a longer period of time, and thus the crystallinity of the PP is raised and the PP becomes harder and more fragile.

In addition, a glass transition temperature of PP is approximately −18° C., and, in the case where the temperature becomes lower than the glass transition temperature, PP is vitrified and tends to become hard and fragile. In particular, when crystallized PP is vitrified, the PP becomes further harder and more fragile. Since PP is generally used as a sealant film of a packaging material packaging frozen food as described above, PP is conveyed in a temperature below −18° C. in many cases. Accordingly, in the case where PP is used as the sealant film and the PP is crystallized and vitrified, there is a higher risk of breaking the packaging material packaging frozen food due to shaking or dropping while the packaging material is conveyed in a temperature below −18° C. Therefore, in order to prevent crystallization of PP, that is, to retain amorphousness of PP, it is required to shorten the cooling time from the melting point to the freezing point. According to the horizontal pillow packing apparatus according to this exemplary embodiment, since the pair of compression rollers 12A and 12B are provided, the center seal portion of the belt-shaped film can be cooled quickly, and the amorphousness of PP can be retained.

Further, in the case where the time in which the sealant film is melted is long, solidification shrinkage occurs. This is because stress is left in the sealant film when manufacturing the belt-shaped film, the remaining stress acts to be released to cause shrinkage when the sealant film is melted, and the base film is drawn by the sealant film as a result of the sealant film being fixed to the base film via a joint surface. This solidification shrinkage is fixed after cooling and newly generates remaining stress in an interface with the base film stuck together, and this causes strength degradation of the packaging material. Accordingly, it is required to shorten the cooling time from the melting point to the freezing point in order to shorten the time in which the sealant film is melted to prevent occurrence of solidification shrinkage, and, according to the horizontal pillow packing apparatus according to this exemplary embodiment, since the pair of compression rollers 12A and 12B are provided, the center seal portion of the belt-shaped film can be cooled quickly and thus the solidification shrinkage of the sealant film can be suppressed.

In addition, since the heating rollers are at a high temperature, particularly in the case where the heating rollers are used in a frozen food producing factory, not only a large air conditioning load is generated but also other devices and so forth located in the vicinity of the heating rollers are heated by radiation or the like, and the produced frozen food may be adversely affected. Particularly, a conventional center sealer has a greater influence because the conventional center sealer is at a higher temperature. However, the horizontal pillow packing apparatus according to the present invention can set a lower temperature and thus the influence can be reduced.

To be noted, although a center sealer including two pairs of heating rollers has been described as an example in this exemplary embodiment, a center sealer including three or more pairs of heating rollers may be alternatively used.

The invention claimed is:

1. A horizontal pillow packing apparatus comprising:
   a center sealer configured to wrap a packing target object by bringing both end portions of a back surface of a belt-shaped film including a base film on a front surface and a sealant film on the back surface in a width direction into contact with each other and seal a center seal portion at which the both end portions of the back surface in the width direction are in contact with each other;
   an end sealer configured to seal and cut both side portions of the belt-shaped film wrapping the packing target object in the width direction, wherein the center sealer includes:
      at least two pairs of heating rollers configured to nip the center seal portion including the base film and the sealant film with the sealant films contacting with each other facing each other, and to heat the sealant film through the base film,
      a pair of compression rollers configured to cool and compress, to bond the center seal portion, and to bond the sealant film heated by the at least two pairs of heating rollers, and
      a control portion to control a temperature of the at least two pairs of heating rollers so that the temperature is lower than a melting point of the base film and higher than a melting point of the sealant film.

2. The horizontal pillow packing apparatus according to claim 1 comprising a preheating portion configured to preheat the center seal portion before the center seal portion is heated by the at least two pairs of heating rollers.

3. The horizontal pillow packing apparatus according to claim 2, wherein the packing target object is frozen food.

4. The horizontal pillow packing apparatus according to claim 1, wherein the packing target object is frozen food.

5. A horizontal pillow packing method for packing a packing target object via horizontal pillow packing by using a horizontal pillow packing apparatus, the horizontal pillow packing apparatus including a center sealer configured to wrap the packing target object by bringing both end portions of a back surface of a belt-shaped film including a base film on a front surface and a sealant film on the back surface in a width direction into contact with each other and seal a center seal portion at which the both end portions of the back surface in the width direction are in contact with each other and an end sealer configured to seal and cut both side portions of the belt-shaped film wrapping the packing target object in the width direction, the horizontal pillow packing method comprising:

a step of nipping the center seal portion including the base film and the sealant film with the sealant films contacting with each other facing each other, and heating the sealant film through the base film at a temperature lower than a melting point of the base film and higher than a melting point of the sealant film, by using at least two pairs of heating rollers of the center sealer; and a step of cooling and compressing, to bond the sealant film, by using a pair of compression rollers of the center sealer, the sealant film heated by the at least two pairs of heating rollers.

6. The horizontal pillow packing method according to claim 5 comprising a step of preheating the center seal portion before the center seal portion is heated by the at least two pairs of heating rollers.

7. The horizontal pillow packing method according to claim 6, wherein the packing target object is frozen food.

8. The horizontal pillow packing method according to claim 5, wherein the packing target object is frozen food.

* * * * *